March 19, 1968  E. H. WIECHMANN  3,374,424
SERIES TYPE POTENTIAL REGULATOR
Filed May 17, 1965  2 Sheets-Sheet 1

INVENTOR.
ELDRED H. WIECHMANN
BY
Richard G. Stahl
HIS ATTORNEY

March 19, 1968  E. H. WIECHMANN  3,374,424
SERIES TYPE POTENTIAL REGULATOR
Filed May 17, 1965  2 Sheets-Sheet 2

INVENTOR.
ELDRED H. WIECHMANN
BY Richard G. Stahr
HIS ATTORNEY

United States Patent Office 3,374,424
Patented Mar. 19, 1968

3,374,424
SERIES TYPE POTENTIAL REGULATOR
Eldred H. Wiechmann, Kokomo, Ind., assignor to General Motors Corporation, Detroit, Mich., a corporation of Delaware
Filed May 17, 1965, Ser. No. 456,190
2 Claims. (Cl. 323—22)

ABSTRACT OF THE DISCLOSURE

A series type potential regulator wherein the current carrying electrodes of a regulating transistor are connected in series with a source of unregulated direct current potential and an external electrical load. The magnitude of base bias potential for the regulating transistor is controlled by the degree of conduction of a control transistor connected in the circuit in such a manner that the conduction therethrough is determined by the magnitude of the regulated potential.

Figure 2:
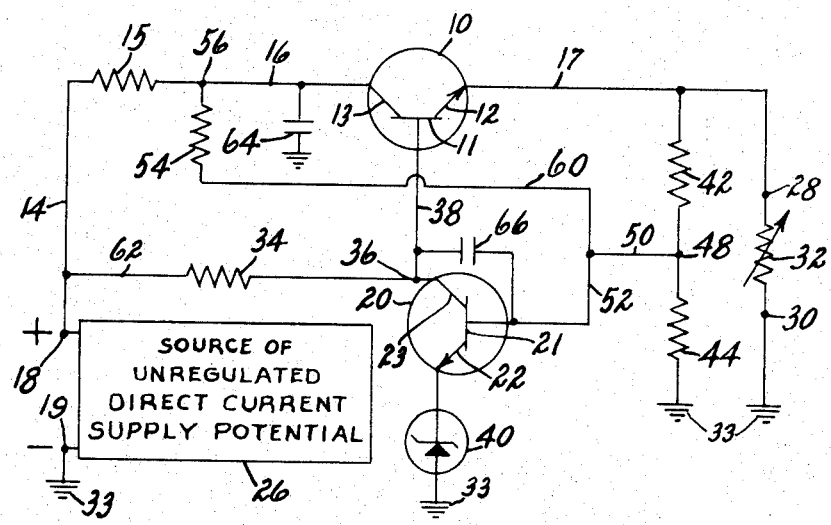

The present invention relates to series type potential regulator devices and, more specifically, to potential regulator devices of the type which anticipates changes in the regulated output potential by continuously sampling the unregulated direct current supply potential.

Frequently, variable impedance electrical circuits or devices are supplied by a source of unregulated direct current supply potential. For example, field radio transmitters may be powered from a hand operated direct current generator. Because the resulting wide fluctuations of supply potential magnitudes cannot be tolerated, it is necessary that a device which precisely regulates the supply potential be employed with applications of this type.

To produce the required supply potential regulation, prior art devices employed complex circuitry including many circuit components which resulted in considerable internal dissipation and, therefore, low performance efficiency.

As applications of this type are becoming increasingly numerous, the requirement of a potential regulator which will operate from a variable unregulated direct current potential source into a variable impedance load with improved regulating characteristics at high operating efficiency and low cost, is apparent.

It is, therefore, an object of this invention to provide an improved series type potential regulator device.

It is another object of this invention to provide an improved series type potential regulator device which produces improved regulation characteristics by anticipating changes in regulated output potential by continuously sampling the unregulated direct current supply potential.

It is a further object of this invention to provide an improved series type potential regulator device which provides improved regulating characteristics at high efficiency and low cost.

In accordance with this invention, an improved series type potential regulator which improves regulation characteristics by anticipating changes in the regulated output potential by continuously sampling the unregulated supply potential is provided wherein a control potential, which varies with the regulated potential, is produced by a potential sensitive arrangement in response to changes in regulated potential and is applied to a series type regulating element, the impedance of which may be varied in response to a control potential, in such a manner that the impedance of the regulating device is varied inversely with regulated potential changes. An anticipating circuit, which is connected between the unregulated supply potential and the potential sensitive arrangement, continuously samples the unregulated supply potential whereby the potential sensitive arrangement anticipates changes in the regulated potential in response to changes in the unregulated supply potential.

Figure 1:
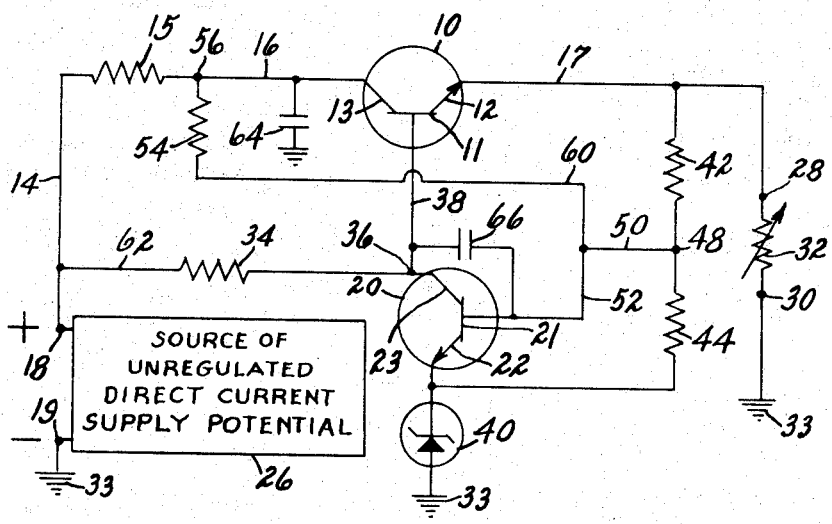
Figure 3:
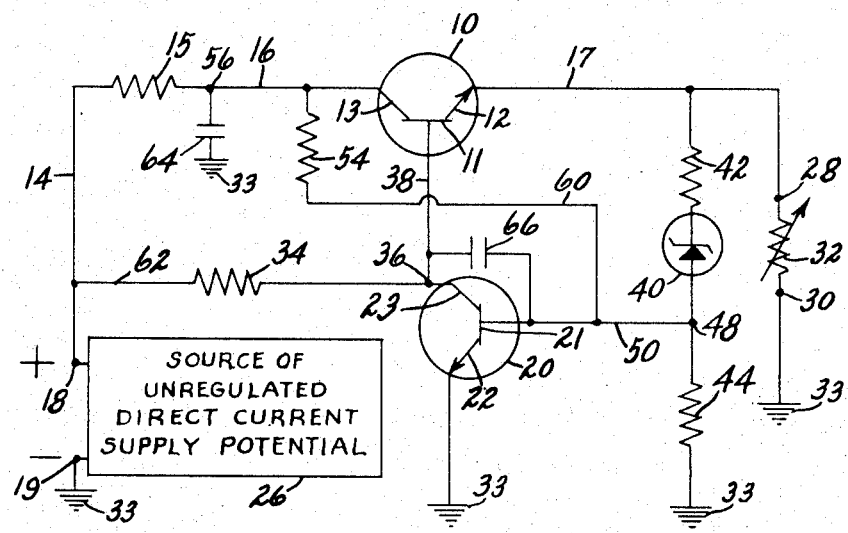
Figure 4:
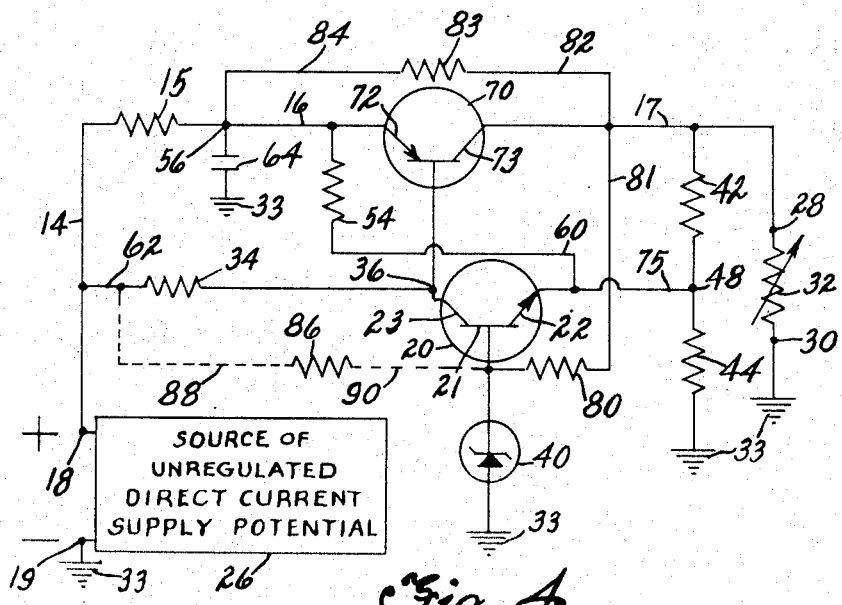

For a better understanding of the present invention, together with additional objects, advantages and features thereof, reference is made to the following description and accompanying drawings in which:

FIGURE 1 sets forth schematically the preferred embodiment of the series type regulator device of this invention, FIGURE 2 sets forth schematically an alternate embodiment of the device of this invention, FIGURE 3 schematically sets forth another alternative arrangement of the device of this invention, and FIGURE 4 schematically sets forth another embodiment of the device of this invention.

Referring to the figures, in which like elements have been given like characters of reference, four embodiments of the series type potential regulator device of this invention are schematically set forth. Throughout the figures, each point of reference or ground potential, since it is the same point electrically, has been illustrated by the accepted schematic symbol and referenced by the numeral 33.

The device of the invention may be used in combination with an unregulated direct current potential source having positive and negative polarity terminals and a variable impedance electrical load which may be electrically interconnected.

As the unregulated direct current potential source may be any one of the many well known in the art and forms no part of this invention, it has been shown in block form throughout the figures and referenced by numeral 26. Similarly, as the variable impedance electrical load may be any of the several well known in the art and forms no part of this invention, it has been represented as a variable resistor throughout the figures and referenced by numeral 32.

To regulate the potential supplied by potential source 26, a potential regulating device of the type the impedance of which may be varied in response to a control potential may be employed. One example of a device of this type is a transistor, the impedance of which may be varied by varying the degree of conduction therethrough. For purposes of describing the novel regulating circuit of this invention, this series potential regulating device has been illustrated as a type NPN transistor 10 in FIGURES 1, 2 and 3 and as a type PNP transistor 70 in FIGURE 4.

To provide proper regulation, the impedance of the series regulating device must be varied directly with supply potential magnitudes. Therefore, the control potential which determines the impedance of the regulating device must vary with supply potential magnitudes.

To produce the control potential which varies with supply potential magnitudes for varying the impedance of the series potential regulating device directly with changes in potential magnitudes, an arrangement which is sensitive to changes of potential magnitudes is provided. This arrangement includes a controllable control device, herein shown as a type NPN control transistor device 20, and a resistor 34.

To continuously sample the unregulated supply potential, an anticipating circuit, comprising resistor 54, for producing an anticipating signal which varies directly with changes in magnitude of supply potential is connected between the unregulated potential source and the circuit arrangement which is sensitive to changes of supply potential magnitude.

As the circuits set forth schematically in FIGURES 1, 2 and 3 are identical in operation, the detailed description of these three embodiments will be in reference to FIGURE 1. The emitter 12 and collector 13 electrodes of regulating transistor device 10 are connected in series between input terminal 18 and output terminal 28. The collector electrode 13 and the emitter electrode 12 are connected in series with input terminal 18 and output terminal 28, respectively, through line 14, resistor 15 and line 16 and regulated potential line 17, respectively. With unregulated potential source 26 connected across input terminals 18 and 19, and poled as shown, and an electrical load connected across output terminals 28 and 30, the collector electrode 13 of transistor 10 is connected to the positive polarity terminal of potential source 26 through input terminal 18 and the emitter electrode 12 is connected to the negative polarity terminal of potential source 26 through electrical load 32, output terminal 30, point of reference or ground potential 33 and input terminal 19. Therefore, type NPN regulating transistor 10 is forward poled.

The series combination of resistor 34 and the emitter-collector electrodes of type NPN control transistor device 20 is connected across input terminals 18 and 19 and supply potential source 26, as shown. As the collector electrode 23 of type NPN control transistor device 20 is connected to the positive polarity terminal of potential source 26 through resistor 34, lead 62 and input terminal 18 and the emitter electrode 22 is connected to the negative polarity terminal of potential source 26 through Zener diode 40, point of reference or ground potential 33 and input terminal 19, type NPN control transistor device 20 is forward poled.

The impedance of control transistor 20 varies with the degree of conduction thereof, therefore, the series combination operates as a voltage divider network having a fixed and variable impedance. The control potential for regulating transistor 10 appears at junction 36 between resistor 34 and the collector electrode 23 of control transistor 20. As resistor 34 is returned to the positive polarity terminal of potential source 26 through lead 62 and input terminal 18, the control potential appearing at junction 36 is of a positive polarity. Increasing conduction through control transistor 20 reduces the impedance thereof which produces a control potential of a less positive magnitude at junction 36. Therefore, this control potential varies in magnitude with the degree of conduction of control transistor device 20.

In view of this, the degree of conduction of control transistor device 20 must be varied with changes of supply potential magnitudes. The degree of conduction of control transistor device 20 may be varied with changes of supply potential by applying a control device bias potential which varies with supply potential magnitudes to a selected one of the electrodes thereof.

To produce this control device bias potential, the series combination of resistors 42 and 44 and Zener diode 40 may be connected in series across regulated potential line 17 and point of reference or ground potential 33. As with any voltage divider network, this network proportions the potential applied thereacross and the control device bias potential for control transistor 20 is taken from junction 48. Changes of unregulated supply potential magnitudes produce a corresponding change of regulated potential magnitudes and, therefore, the magnitude of this control potential appearing at junction 48 varies directly with supply potential magnitudes. This control device bias potential is of a positive polarity and is applied as a forward base bias potential to the base electrode 21 of control transistor 20 through leads 50 and 52 for varying the degree of conduction of control transistor 20 directly with changes in supply potential magnitudes.

The control potential appearing at junction 36 for varying the degree of conduction of regulating transistor 10 directly with changes in supply potential magnitude is applied to the base electrode 11 of regulating transistor 10 through lead 38.

Anticipating circuit resistor 54, for producing an anticipating signal which is of a polarity to aid the control device bias potential appearing at junction 48 and which varies directly with changes of supply potential magnitude, is connected between the base electrode 21 of control transistor 20 and the positive polarity terminal of potential source 26 through leads 60 and 52 and resistor 15, line 14 and input terminal 18, respectively.

Fixed resistor 15 provides overload protection for regulating transistor 10 and also develops the anticipating signal at the collector electrode 13 of regulating transistor 10 in response to load current variations. Capacitors 64 and 66 are radio frequency bypass capacitors.

Regulating transistor 10 is base biased to full conduction when the unregulated supply potential magnitude falls to a minimum value, as determined by load circuit requirements, so that substantially full unregulated supply potential is applied to the output terminals 28 and 30, therefore, control transistor 20 should not conduct at this time. To establish the potential magnitude threshold of conduction for control transistor 20, Zener diode 40 is included in the emitter circuit thereof. Devices of this type are characterized by a substantially constant potential drop thereacross when conducting in the reverse direction with applied reverse polarity potentials of a magnitude at least equal to the rated breakdown potential of the device. As the cathode electrode of this device is connected to the positive polarity terminal of potential source 26 through resistors 44 and 42, line 17, the emitter-base circuit of regulating transistor 10, lead 16, resistor 15, lead 14 and input terminal 18 and the anode electrode is connected to the negative polarity terminal of potential source 26 through point of reference or ground potential 33, this device is reverse poled, therefore, this device clamps the emitter electrode 22 of control transistor device 20 at a potential more positive than that of point of reference or ground potential 33 by a magnitude equal to the drop thereacross.

As the base electrode of a type NPN transistor must be biased by a potential more positive than that of the emitter electrode to produce the proper base-emitter current flow for conduction through a transistor of this type, control transistor 20 will not conduct until the base electrode 21 is biased by a positive potential of a magnitude greater than the positive potential magnitude established on the emitter electrode 22 thereof by conducting Zener diode 40. In this manner, therefore, Zener diode 40 establishes the conduction potential level threshold of control transistor device 20. Zener diode 40 is selected to have a breakdown potential which is substantially equal to the control potential appearing at junction 48 when the regulated potential on line 17 is of a magnitude equal to the minimum value as determined by load circuit requirements.

Increases in unregulated supply potential magnitudes are reflected as increases in regulated potential appearing on line 17 and in the control bias potential appearing at junction 48. This increase in control bias potential magnitude increases the forward base bias potential of control transistor 20, thereby increasing the degree of conduction therethrough. With increased conduction through control transistor 20, the regulating transistor 10 control potential appearing at junction 36 becomes less positive, thereby reducing the degree of conduction therethrough, a condition which tends to reduce the magnitude of the regulated potential to the selected value.

The anticipating signal circuit resistor 54, returned to that input terminal which is of the correct polarity to forward base bias control transistor 20, in this instance input terminal 18 through fixed resistor 15 and line 14, produces a positive polarity signal which varies with supply potential magnitudes which aids the control potential appearing at junction 48 to forward bias control transistor 20. Therefore, the inherent lag in the circuitry for producing the proper control potential for transistor 20 is compensated for and results in improved voltage regulation in that changes in the regulated potential appearing in line 17 are anticipated by this circuit in response to changes in the unregulated supply potential.

The alternate circuitry set forth in FIGURES 2 and 3 differs from that of FIGURE 1 only to the extent that the Zener diode 40 is not included in the control transistor control potential voltage divider network in FIGURE 2 and Zener diode 40 is not in the emitter circuit of control transistor 20 in FIGURE 3. The operation of these circuits is electrical and the reason for Zener diode 40 is the same.

It has been found, however, that the arrangement shown in FIGURE 1 improves regulation and efficiency in that the divider current is utilized to maintain adequate Zener diode breakdown current during low line voltage and also tends to equalize any conduction potential level threshold variations which may result from variations in Zener current.

Referring to FIGURE 4 which is another embodiment of the unique regulator device of this invention employing a type PNP regulating transistor 70 having its emitter 72 and collector 73 electrodes connected in series between input terminal 18 and output terminal 28.

As the emitter electrode 72 is connected to the positive polarity terminal of potential source 26 through line 16, resistor 15, line 14 and input terminal 18 and since the collector electrode 73 is connected to the negative polarity terminal of potential source 26 through line 17, output terminal 28, the load device 32 and point of reference potential 33, regulating transistor 70 is forward poled.

In this embodiment, the collector 23 and base 21 electrodes of control transistor device 20 are connected across input terminals 18 and 19 through resistor 34 and lead 62 and through Zener diode 40 and point of reference or ground potential 33, respectively. The emitter electrode 23 is connected to junction 48 between resistors 42 and 44 of the control transistor control potential voltage divider network, therefore, control transistor 20 is forward poled.

The anode electrode of Zener diode 40 is connected to the positive polarity terminal of potential source 26 through point of reference potential 33 and input terminal 19 and the cathode electrode is connected to the negative polarity terminal of potential source 26 through resistor 80, lead 81, lead 82, resistor 83, lead 84, resistor 15, lead 14 and input terminal 18 and, therefore, is reversed poled. Zener diode 40 is selected to have a reverse breakdown potential which, with this device conducting in a reverse direction, is of a magnitude more positive than the control potential at junction 48. Therefore, control transistor 20 is normally conducting.

With control transistor 20 conducting, the potential at point 36 is of a magnitude substantially equal to the potential appearing at junction 48 less the drop across the collector-emitter circuit of transistor 20. As this potential is more negative than the potential appearing at input terminal 18, regulating transistor 20 is normally conducting.

With increases in supply and regulater potential, the control transistor bias potential appearing at junction 48 increases in a positive direction, and is applied to the emitter electrode 22 of control transistor 20 through lead 75. This positive polarity potential reverse emitter biases control transistor 20, thereby tending to decrease the conduction therethrough. With decreased conduction through control transistor 20, the control potential appearing at junction 36 becomes more positive and decreases conduction through regulating transistor 20 thereby maintaining the regulated potential substantially constant.

As with the embodiments of FIGURES 1, 2 and 3, the anticipating signal resistor 54 is connected to line 16 at junction 56 which is of a positive polarity and, therefore, the anticipating signal produced thereby aids the control potential appearing at junction 48 to reverse emitter bias control transistor 20.

Resistors 80 and 83 may be replaced by a single resistor 86, connected as indicated by dashed lines 88 and 90. This arrangement is identical in operation, however, the use of resistors 80 and 83 provides improved regulation and protection against short circuit load conditions.

Throughout this specification, specific devices have been recited for the series regulating device and the controllable control device and specific circuitry of the potential sensitive arrangement for producing the signal which controls the series regulating device has been described. It is to be understood that alternate devices having similar electrical characteristics and alternated potential sensitive circuitry which will function similarly may be substituted therefor.

While a preferred embodiment of the present invention has been shown and described it will be obvious to those skilled in the art that various modifications and substitutions may be made without departing from the spirit of the invention which is to be limited only within the scope of the appended claims.

What is claimed is as follows:

1. A series type potential regulator device comprising in combination with a source of unregulated direct current supply potential having positive and negative polarity terminals and an electrical load, a potential regulating transistor device having base, emitter and collector electrodes for regulating said supply potential, means for connecting said emitter and collector electrodes in series with a selected one of said terminals of said supply potential source and said electrical load and forward poled, means including a resistor and a control transistor device having base, emitter and collector electrodes for producing a control potential which varies with the degree of conduction of said control transistor device, means for connecting said resistor and said base and collector electrodes of said control transistor device in series across said supply potential source, means for producing a reverse emitter bias potential the magnitude of which varies directly with said supply potential magnitudes, means for applying said reverse emitter bias potential to the emitter electrode of said control transistor device for varying the degree of conduction of said control transistor device inversely with said supply potential magnitudes, means for applying said control potential to the base electrode of said regulating transistor device for controlling the degree of conduction of said regulating transistor device inversely with changes in said supply potential magnitudes, an anticipating signal circuit means for producing an anticipating signal which varies directly with changes of said supply potential magnitudes and means for connecting said anticipating signal circuit between the emitter electrode of said control transistor device and that terminal of said supply potential source which is of the polarity to aid said reverse emitter bias potential.

2. A series type potential regulator device comprising in combination with a source of unregulated direct current supply potential having positive and negative polarity terminals and an electrical load, a potential regulating transistor device having base, emitter and collector electrodes for regulating said supply potential, means for connecting said emitter and collector electrodes in series with a selected one of said terminals of said supply potential source and said electrical load and forward poled, means including a first resistor and a control transistor device having base, emitter and collector electrodes for producing a control potential which varies with the degree of conduction of said control transistor device, means for connecting said first resistor and said base and collector electrodes of said control transistor device in series across said supply potential source, means for producing a reverse emitter bias potential the magnitude of which varies directly with said supply potential magnitudes; means for applying said reverse emitter bias potential to the emitter electrode of said control transistor device for varying the degree of conduction of said control transistor device inversely with said supply potential magnitudes, means for applying said control potential to the base electrode of said regulating transistor device for controlling the degree of conduction of said regulating transistor device inversely with changes in said supply potential magnitudes and a second resistor connected between the emitter electrode of said control transistor device and that terminal of said supply potential source which is of the polarity to aid said reverse emitter bias potential.

References Cited

UNITED STATES PATENTS

| 3,045,169 | 7/1962 | Barber | 321—18 |
| 3,105,187 | 9/1963 | Schauwecker | 323—22 |
| 3,123,759 | 3/1964 | Grey | 323—22 |
| 3,201,606 | 8/1965 | Mamon | 323—22 |
| 3,204,175 | 8/1965 | Kuriger | 323—22 |

FOREIGN PATENTS 829,945    3/1960    Great Britain

JOHN F. COUCH, *Primary Examiner.*

A. D. PELLINEN, *Assistant Examiner.*